(12) United States Patent
Cronk

(10) Patent No.: US 7,756,975 B1
(45) Date of Patent: Jul. 13, 2010

(54) METHODS AND SYSTEMS FOR AUTOMATICALLY DISCOVERING INFORMATION ABOUT A DOMAIN OF A COMPUTING DEVICE

(75) Inventor: Robert Cronk, Springville, UT (US)

(73) Assignee: Symantec Corporation, Cupertino, CA (US)

( * ) Notice: Subject to any disclaimer, the term of this patent is extended or adjusted under 35 U.S.C. 154(b) by 343 days.

(21) Appl. No.: 11/950,505

(22) Filed: Dec. 5, 2007

(51) Int. Cl.
*G06F 15/173* (2006.01)
*G06F 15/16* (2006.01)

(52) U.S. Cl. ...................... 709/224; 709/208
(58) Field of Classification Search ........................ None
See application file for complete search history.

(56) References Cited

U.S. PATENT DOCUMENTS

| | | | |
|---|---|---|---|
| 7,356,016 B2* | 4/2008 | Park et al. | 370/342 |
| 7,512,987 B2* | 3/2009 | Williams | 726/27 |
| 7,548,945 B2* | 6/2009 | Asnis | 709/201 |
| 2002/0178238 A1* | 11/2002 | Fletcher et al. | 709/220 |
| 2004/0121764 A1* | 6/2004 | Rivero | 455/418 |
| 2007/0061632 A1* | 3/2007 | Uddenberg et al. | 714/44 |

OTHER PUBLICATIONS

Kamil Sarac, Kevin C. Almeroth; "Tracetree: A Scalable Mechanism to Discover Multicast Tree Topologies in the Internet"; Transactions on Networking vol. 12, No. 5; Oct. 2004.

* cited by examiner

*Primary Examiner*—John B. Walsh
(74) *Attorney, Agent, or Firm*—Holland & Hart

(57) ABSTRACT

Methods and systems for automatically discovering information about a domain of a computing device are disclosed. In certain embodiments, the method may comprise receiving connection-characteristic information from at least one common-domain computing device located within the domain of the computing device, identifying, based on the connection-characteristic information received from the at least one common-domain computing device, at least one characteristic of the domain computing device, transmitting domain-characteristic information to a source computing device, the domain-characteristic information comprising the at least one characteristic of the domain of the computing device, and receiving domain-characteristic-dependent data from a source computing device. Corresponding systems and computer-readable media are also disclosed.

20 Claims, 10 Drawing Sheets

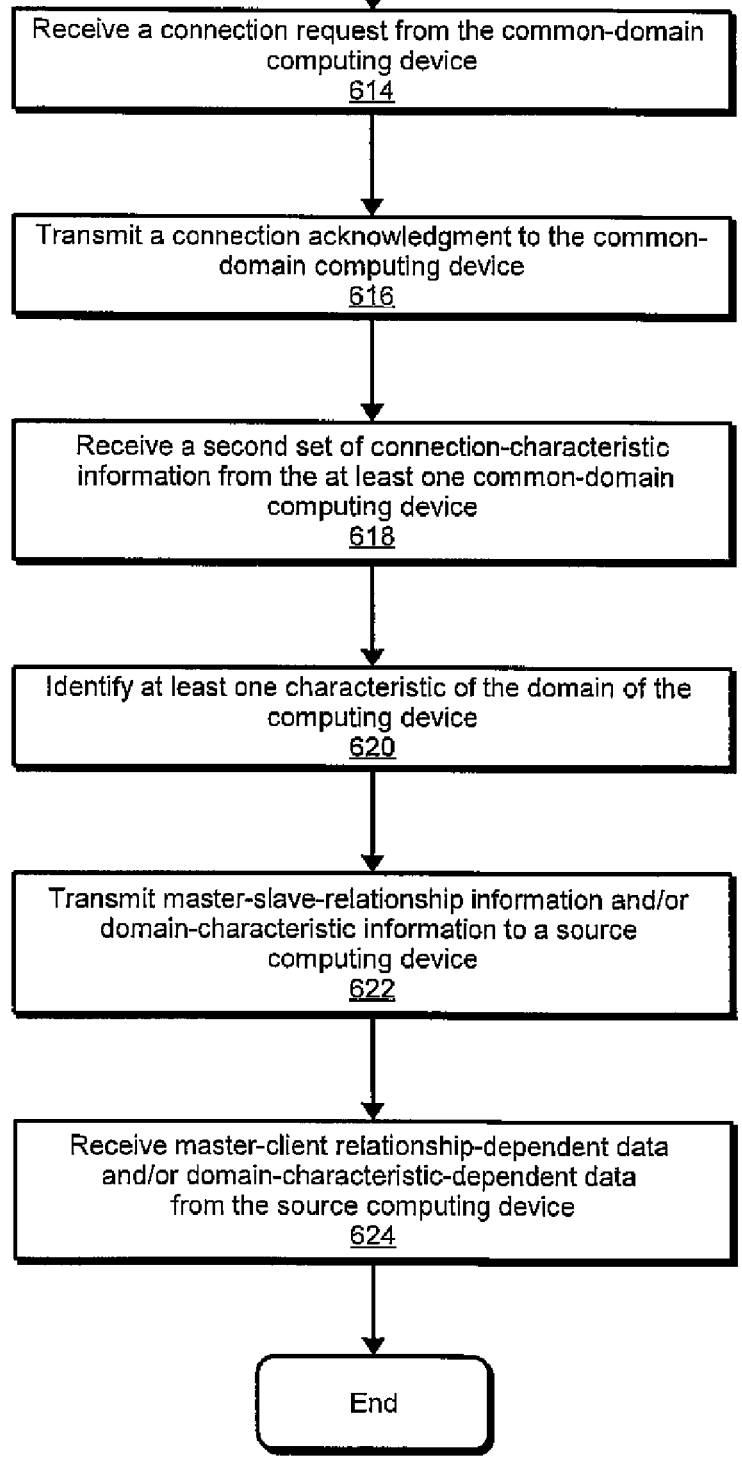

METHODS AND SYSTEMS FOR AUTOMATICALLY DISCOVERING INFORMATION ABOUT A DOMAIN OF A COMPUTING DEVICE

BACKGROUND

In today's networking environment, networks typically comprise one or more network segments or "domains." In order to effectively manage a network comprising one or more domains, various characteristics of each domain within the network may need to be known or discovered. For example, in order to remedy problems due to routing protocol limitations, network misconfigurations, or routing policy decisions, each of which may affect the performance of the domain or the network as a whole, a computing device or network administrator may be required to know or discover the topology of a domain (that is, the arrangement or physical or logical location of each computing device within the domain).

Unfortunately, the characteristics of a domain are often unknown to devices both within and outside of the domain. For example, a server tasked with managing computers within a multicast domain (i.e., a domain that employs a one-to-many routing scheme) is typically unaware of many of the characteristics of the multicast domain. For example, the server may be unaware of the number of computing devices located within the multicast domain, the topology of the multicast domain, or the transmission rate or connection speed of each device within the multicast domain. As such, the server may be unable to effectively troubleshoot problems within the multicast domain, modify a multicast session, or otherwise distribute domain-characteristic-dependent data (i.e., data that, in order to be distributed correctly, may require an understanding of various characteristics of the domain) to computing devices within the multicast domain.

Similarly, a computing device within a multicast domain is typically unaware of the characteristics of other computing devices within its domain. For example, the computing device may be unaware of the physical or logical location of other computing devices within its domain or the transmission rate or connection speed of these other devices. Accordingly, the computing device may have difficulty identifying and establishing master-client relationships (which, as explained below, may be required to facilitate multicast sessions) with other computing devices within its multicast domain. Unfortunately, many prior attempts to discover the characteristics of a domain of a computing device have been ineffective or impractical.

SUMMARY

In certain embodiments, a computer-implemented method for automatically discovering information about a domain computing device may comprise receiving connection-characteristic information from at least one common-domain computing device located within the domain of the computing device, identifying, based on the connection-characteristic information received from the at least one common-domain computing device, at least one characteristic of the domain of the computing device, transmitting domain-characteristic information to a source computing device, the domain-characteristic information comprising the at least one characteristic of the domain of the computing device, and receiving domain-characteristic-dependent data from the source computing device.

The method may also comprise, prior to receiving the connection-characteristic information from the at least one common-domain computing device, receiving a request from the source computing device to discover information about the domain of the computing device and, in response to the request from the source computing device, multicasting connection-characteristic information associated with the computing device to all common-domain computing devices in the domain of the computing device. Alternatively, the method may comprise, prior to receiving connection-characteristic information from the at least one common-domain computing device, determining that a pre-determined period of time has expired and autonomously multicasting connection-characteristic information associated with the computing device to all common-domain computing devices in the domain of the computing device.

The method may also comprise, prior to identifying the at least one characteristic of the domain of the computing device, determining, by comparing the connection-characteristic information received from the at least one common-domain computing device with connection-characteristic information associated with the computing device, a master-client relationship between the computing device and the at least one common-domain computing device and transmitting a master-client-relationship instruction to the at least one common-domain computing device. In certain embodiments, transmitting the master-client-relationship instruction to the at least one common-domain computing device may comprise multicasting the master-client-relationship instruction to all common-domain computing devices in the domain of the computing device. The master-client-relationship instruction may comprise an instruction to perform client-specific tasks.

In addition, the method may further comprise, after transmitting the master-client-relationship instruction to the at least one common-domain computing device, receiving a connection request from the at least one common-domain computing device, transmitting a connection acknowledgement to the at least one common-domain computing device, and receiving a second set of connection-characteristic information from the at least one common-domain computing device located within the domain of the computing device. In this embodiment, the at least one characteristic of the domain of the computing device may be identified based on the second set of connection-characteristic information received from the at least one common-domain computing device.

The method may also further comprise determining, by comparing the connection-characteristic information received from the at least one common-domain computing device with connection-characteristic information associated with the computing device, a master-client relationship between the computing device and the at least one common-domain computing device, transmitting a count request to the at least one common-domain computing device, receiving a count reply from the at least one common-domain computing device, determining whether the number of count replies received is greater than a multicast-threshold number, if the number of count replies received is greater than the multicast-threshold number, transmitting a master-client-relationship instruction to the at least one common-domain computing device, receiving a connection request from the at least one common-domain computing device, and transmitting a connection acknowledgement to the at least one common-domain computing device.

In certain embodiments, transmitting count requests to the at least one common-domain computing device may comprise multicasting count requests to all common-domain computing devices in the domain of the computing device. Similarly, transmitting the master-client-relationship instruction to the at least one common-domain computing device may comprise multicasting the master-client-relationship instruction to all common-domain computing devices in the domain of the computing device.

The connection-characteristic information may comprise processor-speed information for at least one common-domain computing device, connection-speed information for at least one common-domain computing device, logical-address information for at least one common-domain computing device, physical-address information for at least one common-domain computing device, hardware-address information for at least one common-domain computing device, or any other potentially relevant information. In addition, the domain-characteristic information may comprise connection-characteristic information associated with the computing device, the connection-characteristic information received from the at least one common-domain computing device, a master-client-relationship instruction, domain-topology information, or any other potentially relevant information.

The computing device may be a multicast-capable computing device and the domain may be a multicast domain. The source computing device may be a server. In addition, one or more of the steps described and/or illustrated herein may be performed by the computing device. The domain-characteristic-dependent data may comprise a computing device image, a software installation package, a software program update, an operating system update, troubleshooting data, or the like.

In an additional embodiment, a computer-implemented method for automatically discovering information about a domain of a computing device may comprise receiving a first set of connection-characteristic information from at least one common-domain computing device located within the domain of the computing device, determining, by comparing the first set of connection-characteristic information received from the at least one common-domain computing device with connection-characteristic information associated with the computing device, a master-client relationship between the computing device and the at least one common-domain computing device, transmitting a master-client-relationship instruction to the at least one common-domain computing device, transmitting master-client-relationship information to a source computing device, and receiving data from a source computing device.

The method may also comprise receiving a second set of connection-characteristic information from the at least one common-domain computing device located within the domain of the computing device, identifying, based on the second set of connection-characteristic information received from the at least one common-domain computing device, at least one characteristic of the domain of the computing device, and transmitting domain-characteristic information to the source computing device, the domain-characteristic information comprising the at least one characteristic of the domain of the computing device.

The data received from the source computing device may be master-client-relationship dependent data or domain-characteristic-dependent data that comprises a computing device image, a software installation package, a software program update, an operating system update, or any other master-client-relationship dependent data.

In certain embodiments, a computer-readable medium may comprise one or more computer-executable instructions that, when executed by a computing device, cause the computing device to receive connection-characteristic information from at least one common-domain computing device located within the domain of the computing device, identify, based on the connection-characteristic information received from the at least on common-domain computing device, at least one characteristic of the domain of the computing device, transmit domain-characteristic information to a source computing device, the domain-characteristic information comprising the at least one characteristic of the domain computing device, and receive domain-characteristic-dependent data from the source computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 6A-6B are flow diagrams of an exemplary computer-implemented method for automatically discovering information about a domain of a computing device according to an additional embodiment.

Figure 1:
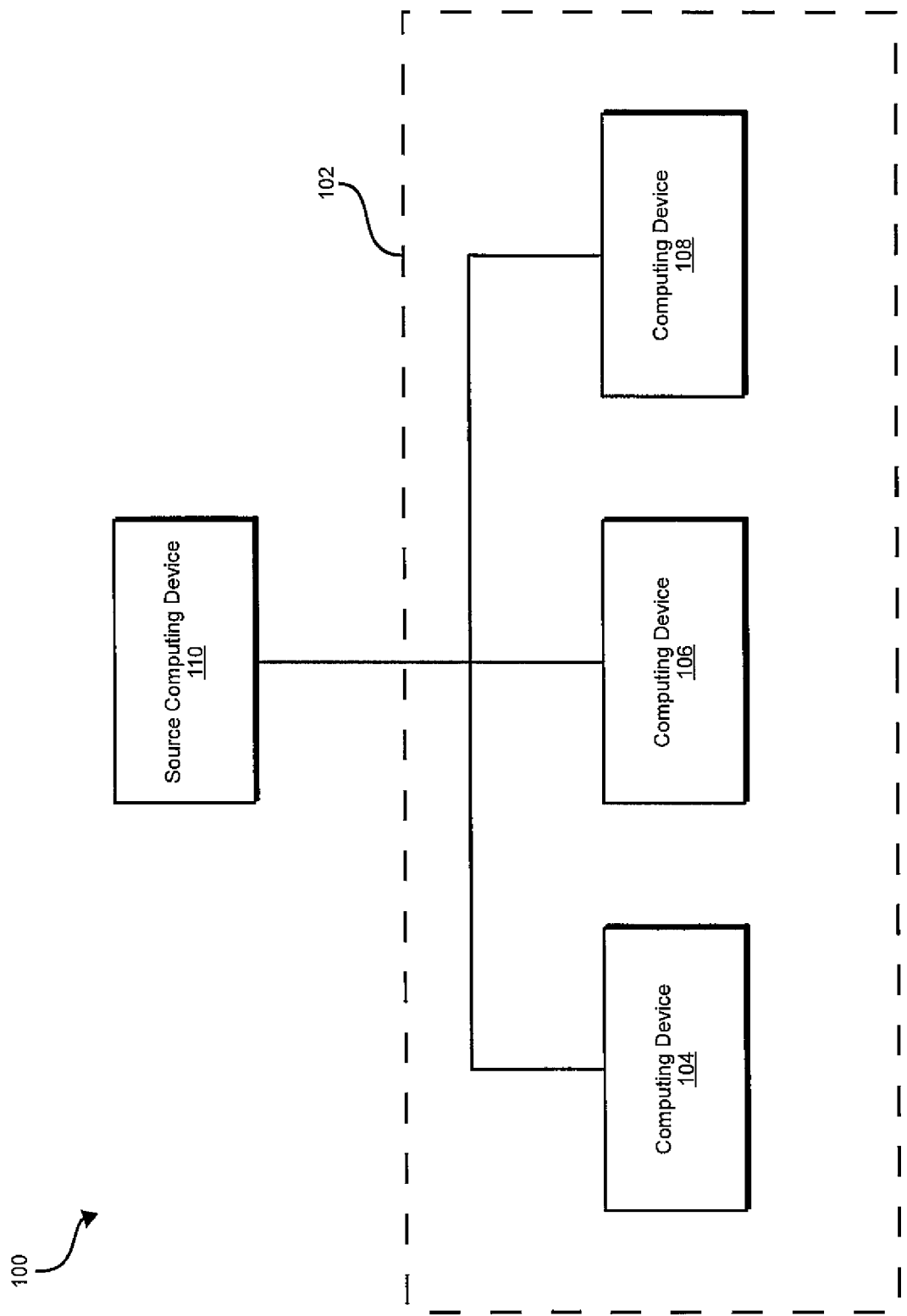
FIG. 1 is illustration of an exemplary system capable of implementing one or more of the embodiments described and/or illustrated herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure relates generally to methods and systems for automatically discovering information about the domain of a computing device. FIG. 1 is an illustration of an exemplary system 100 capable of implementing one or more of the exemplary embodiments described and/or illustrated herein. As illustrated in this figure, exemplary system 100 may comprise a source computing device 110 in communication with one or more computing devices in a domain 102. Source computing device 110 generally represents any type or form of device capable of executing computer-readable instructions. Examples of source computing device 110 include, without limitation, a server, a database, a remote device, or any other computing device.

Domain 102 generally represents any type or form of network segment or domain. In certain embodiments, and as seen in FIG. 1, domain 102 may comprise a plurality of networked computing devices 104, 106, and 108. Although illustrated as having a linear or bus topology, domain 102 may be configured in any type or form of network topology. Exemplary network topologies for domain 102 include, without limitation, a star topology, a ring topology, a mesh topology, a bus topology, a tree topology, a hybrid topology, or any combination thereof. As will be discussed in greater detail below, in certain embodiments domain 102 may represent a multicast domain comprising a plurality of computing devices configured to facilitate a multicast session. In addition, and as will be discussed in greater detail below, in certain embodiments one or more of computing devices 104, 106, and 108 may, by implementing one or more of the methods described and/or illustrated herein, discover (either autonomously or at the request of an additional computing device, such as source computing device 110 in FIG. 1) information about other computing devices within domain 102.

Figure 2:
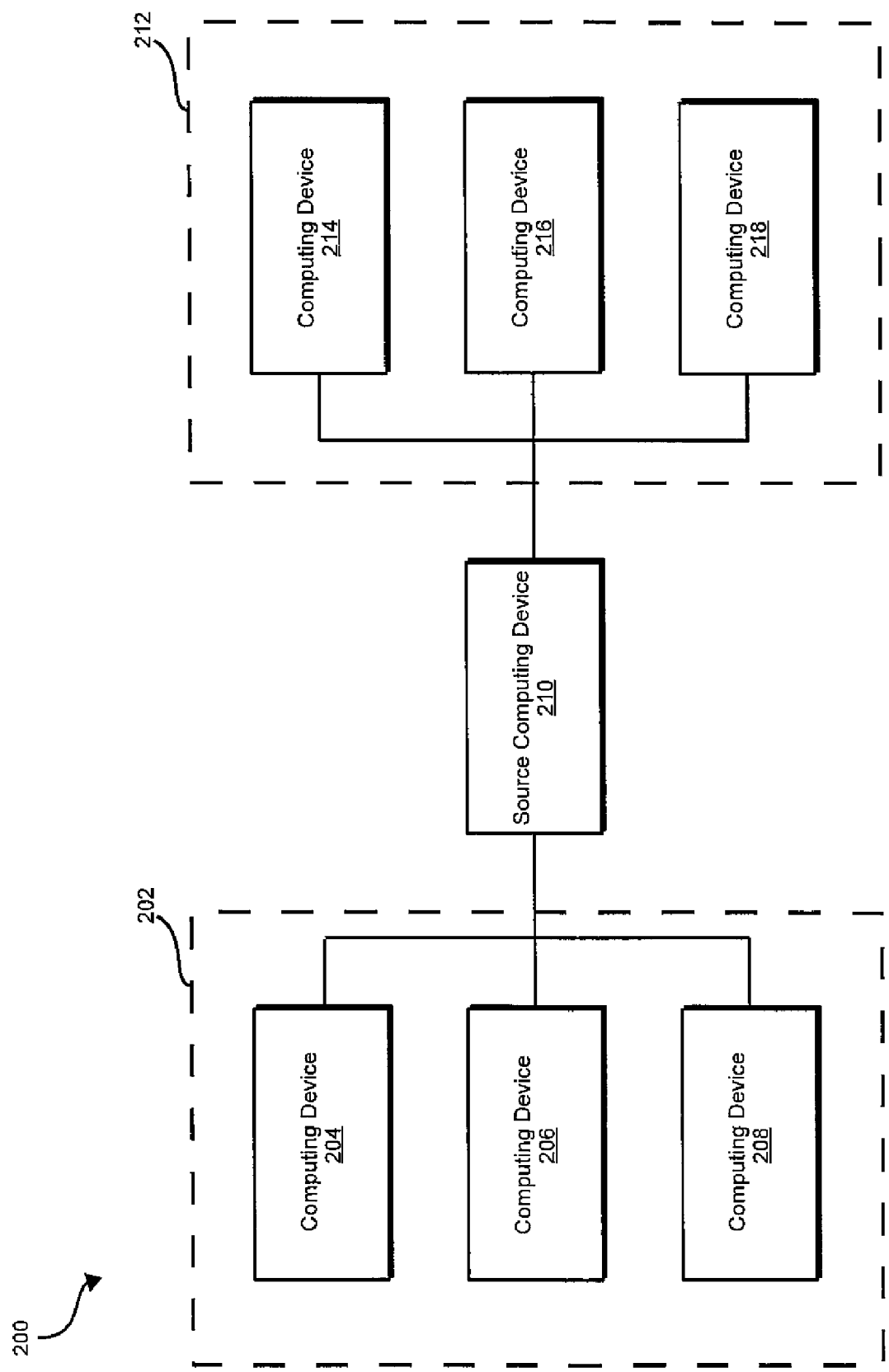
FIG. 2 is illustration of an alternative exemplary system capable of implementing one or more of the embodiments described and/or illustrated herein.

As will be described in greater detail below, in certain embodiments the methods described and/or illustrated herein may be used to automatically discover information about a plurality of domains. Accordingly, FIG. 2 is a block diagram of an exemplary system 200 comprising a source computing device 210 in communication with a first domain 202 and a second domain 212. As is illustrated in this figure, first domain 202 may comprise a plurality of networked computing devices 204, 206, and 208. Similarly, second domain 212 may comprise a plurality of networked computing devices 214, 216, and 218. As with exemplary system 100 in FIG. 1, first domain 202 and second domain 212 generally represent any type or form of network segment or domain; including, for example, multicast domains.

Figure 3:
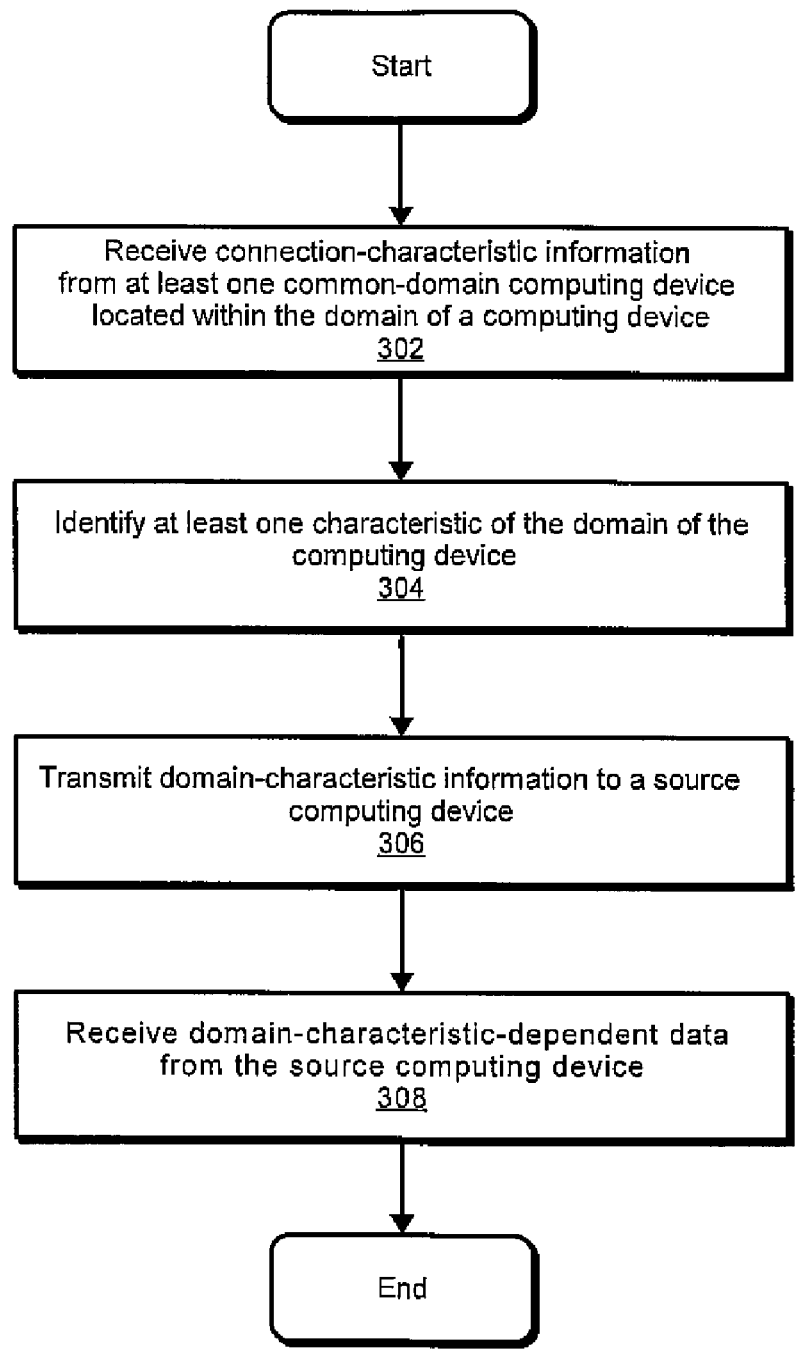
FIG. 3 is a flow diagram of an exemplary computer-implemented method for automatically discovering information about a domain of a computing device according to at least one embodiment.

FIG. 3 is a flow diagram of an exemplary computer-implemented method 300 for automatically discovering information about the domain of a computing device. As illustrated in this figure, at step 302 a computing device within a domain (such as computing devices 104, 106, and 108 in domain 102 in FIG. 1 or computing devices 204, 206, 208, 214, 216, and 218 in FIG. 2) may receive connection-characteristic information from at least one common-domain computing device located within the same domain as the computing device. The phrase "connection-characteristic information" generally refers to information that details one or more characteristics of a computing device within a network segment or domain. Examples of connection-characteristic information include, without limitation, the processing or computing speed of a computing device, the amount of available storage or memory of a computing device, the transmission rate or connection speed of a computing device, the logical address of a computing device, the physical address of a computing device, the hardware address (such as a MAC address) of a computing device, or any other potentially relevant information. In addition, the phrase "common-domain computing device" generally refers to a computing device located within the same domain as another computing device. For example, computing devices 106 and 108 in FIG. 1 may be considered common-domain computing devices relative to computing device 104 in domain 102.

In step 304, the computing device may identify, based on the connection-characteristic information received in step 302, at least one characteristic of the domain of the computing device. Examples of characteristics of the domain that may be identified include, without limitation, the topology of the domain, the transmission rate or connection speed of one or more computing devices in the domain, the logical address of one or more computing devices in the domain, the physical address of one or more computing devices in the domain, the hardware address (such as a MAC address) of one or more computing devices in the domain, or any other potentially relevant information.

For example, at step 302 computing device 104 in FIG. 1 may receive connection-characteristic information from both computing device 106 and computing device 108. In this example, the connection-characteristic information received from computing device 106 and computing device 108 may identify the transmission rates or connection speeds of computing device 106 and computing device 108. Accordingly, at step 304 computing device 104 may identify the computing device within domain 102 that has the fastest relative transmission rate or connection speed by comparing the connection speed of computing device 104 with the connection speeds identified in the connection-characteristic information received from computing device 106 and computing device 108 in step 302.

At step 306, the computing device may transmit domain-characteristic information to a source computing device, such as source computing device 110 in FIG. 1. The phrase "domain-characteristic information" generally refers to information comprising at least one characteristic about the domain of the computing device. Examples of domain-characteristic information include, without limitation, domain-topology information (that is, information identifying the arrangement or layout of devices within the domain), connection-speed information for at least one computing device within the domain, logical-address information for at least one computing device within the domain, physical-address information for at least one computing device within the domain, hardware-address information for at least one computing device within the domain, or any other type of information detailing a characteristic of the domain of the computing device. Examples of domain-topology information include, without limitation, the number of computing devices in the domain, the physical distance between computing devices in the domain, the physical interconnections of computing devices in the domain, and the transmission rates of computing devices in the domain.

At step 308, the computing device may receive domain-characteristic-dependent data from the source computing device. The phrase "domain-characteristic-dependent data" generally refers to data that, in order to be transmitted or received correctly, may require an understanding of one or more characteristics of the domain of a computing device. For example, domain-characteristic-dependent data may refer to data that is transmitted to or received by a computing device having: a specific logical address, a specific physical address, a specific hardware address, a specific transmission rate or connection speed, or the like. Examples of domain-characteristic-dependent data include, without limitation, a disk or computing device image, a software installation package, a software program update, an operating system update, troubleshooting data, or the like. Upon completion of step 308, exemplary method 300 may terminate.

Figure 4:
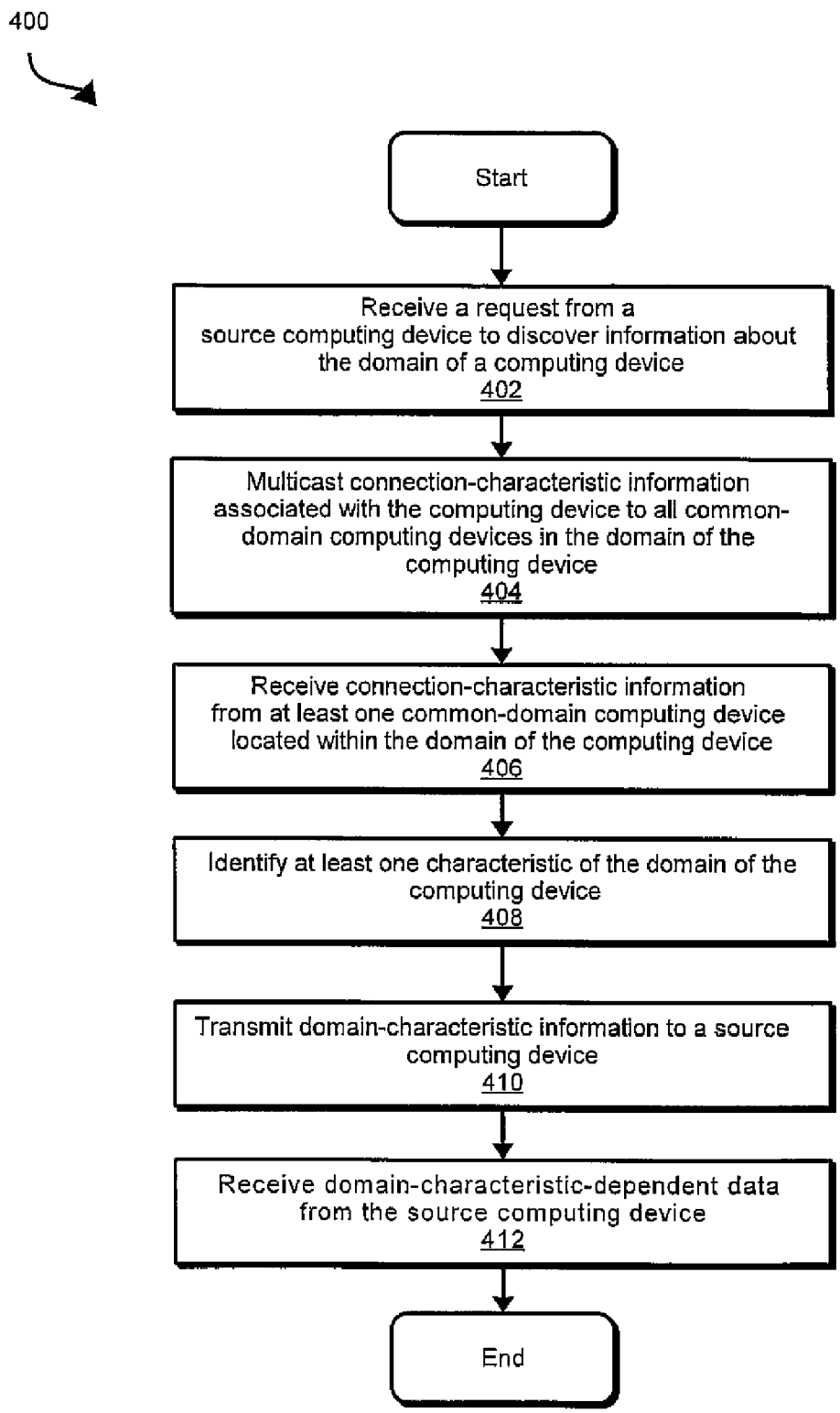
FIG. 4 is a flow diagram of an exemplary computer-implemented method for automatically discovering information about a domain of a computing device according to an additional embodiment.

The exemplary embodiments described and/or illustrated herein may be performed by a computing device, such as computing devices 104, 106, and/or 108 in FIG. 1, either autonomously or at the request of an additional computing device, such as source computing device 110 in FIG. 1. FIG. 4 is a block diagram of an exemplary computer-implemented method 400 for discovering information about a domain of a computing device that is performed at the request of a source computing device, such as source computing device 110 in FIG. 1. As illustrated in this figure, at step 402 a computing device, such as computing device 104 in FIG. 1, may receive a request from a source computing device, such as source computing device 110 in FIG. 1, to discover information about the domain of the computing device. At step 404, the computing device may multicast connection-characteristic information associated with the computing device to all common-domain computing devices in the domain of the computing device. For example, computing device 104 may, upon receiving a request to discover information about its domain from source computing device 110, multicast its MAC address and its transmission rate or connection speed to all other computing devices within its domain 102 (e.g., computing device 106 and computing device 108).

At step 406, the computing device may receive connection-characteristic information from at least one common-domain computing device located within the domain of the computing device. In certain embodiments, and as will be discussed in greater detail below in connection with FIGS. 6A-6B, the connection-characteristic information received at step 406 may be received after establishing a master-client relationship between the computing device and at least one common-domain computing device located within the domain of the computing device.

At step 408, the computing device may identify, based on the connection-characteristic information received at step 406, at least one characteristic of the domain of the computing device. At step 410, the computing device may transmit domain-characteristic information to the source computing device. At step 412, the computing device may receive domain-characteristic-dependent data from the source computing device. Upon completion of step 412, exemplary method 400 may terminate.

For the sake of clarity, and by way of example only, the following detailed description will provide, with reference to FIG. 1, an illustration of how exemplary method 400 may be implemented. In this example, computing device 104 may have a connection speed of 100, computing device 106 may have a connection speed of 200, and computing device 108 may have a connection speed of 50.

At step 402, computing devices 104, 106, and 108 may receive a request from source computing device 110 to discover information about their domain (i.e., domain 102). In certain embodiments, computing devices 104, 106, and 108 may, upon receiving the request from source computing device 110 in step 402, determine whether any devices within their domain are currently multicasting connection-characteristic information. If computing devices 104, 106, or 108 determine that no other computing devices within their domain are currently multicasting connection-characteristic information (for example, if computing devices 104, 106, or 108 fail to receive connection-characteristic information from another computing device within a predetermined period of time, such as three seconds, after receiving the request from source computing 110), or if computing devices 104, 106, or 108 determine that other computing devices within their domain are multicasting connection-characteristic information that is inferior to their own connection characteristics, as explained below, then at step 404 computing devices 104, 106, or 108 may begin multicasting connection-characteristic information to all other computing devices within domain 102.

For example, computing device 108 may, in response to the request received from source computing device 110 in step 402, determine whether any other computing devices within domain 102 are multicasting connection-characteristic information. In this example, since no other devices are currently multicasting, at step 404 computing device 108 may, after determining that no other devices are multicasting, begin periodically multicasting (at a rate of, for example, about once per second) connection-characteristic information identifying its MAC address and connection speed to all other computing devices within domain 102 (i.e., computing devices 104 and 106).

At step 406, computing device 106 may, while listening for data, receive the connection-characteristic information (containing, for example, connection speed and MAC address information) transmitted by computing device 108. Computing device 106 may then compare its connection speed with that of computing device 108. Because the connection speed of computing device 106 is, in this example, greater than that of computing device 108, computing device 106 may immediately begin multicasting its connection-characteristic information to the other computing devices within domain 102 (namely, computing devices 104 and 108).

When computing device 104 receives, while listening for data, the connection-characteristic information transmitted by computing devices 106 and/or 108, it may, upon comparing its connection speed with that of computing devices 106 and/or 108, refrain from multicasting its connection speed to all other devices within domain 102 since its connection speed is less than at least one other computing device in domain 102. Similarly, when computing device 108 receives the connection-characteristic information transmitted by computing device 106, it may, upon comparing its connection speed with that of computing device 106, cease multicasting its connection speed to all other devices within domain 102 since its connection speed is less than at least one other computing device in domain 102.

At step 408, computing device 106 may identify, based on the connection-characteristic information received from computing devices 104 and 108, at least one characteristic of domain 102, such as the speed of each computing device within domain 102. In certain embodiments, and as will be discussed in greater detail below in connection with FIGS. 6A-6B, the at least one characteristic of domain 102 may be identified based on a second set of connection-characteristic information received after establishing a master-client relationship between the computing device and at least one common-domain computing device located within the domain of the computing device.

At step 410, computing device 106 may transmit this domain-characteristic information to source computing device 110. At step 412, computing device 106 may receive domain-characteristic-dependent data from the source computing device. For example, computing device 106 may receive a disk image from source computing device 110 since it has the fastest connection speed in domain 102. Upon completion of step 412, exemplary method 400 may terminate.

Figure 5:
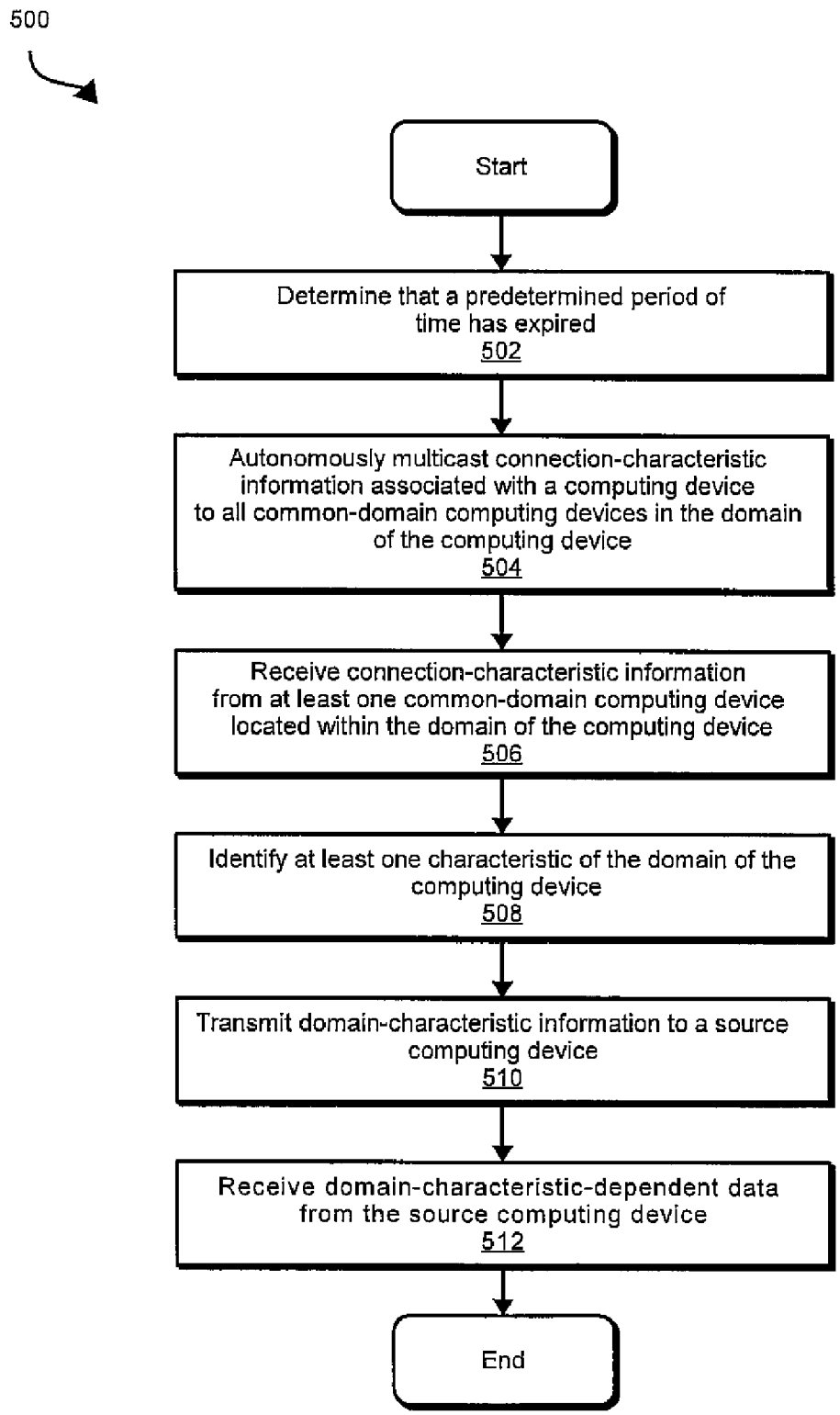
FIG. 5 is a flow diagram of an exemplary computer-implemented method for automatically discovering information about a domain of a computing device according to an additional embodiment.

As explained above, a computing device, such as computing device 104 in FIG. 1, may also autonomously perform one or more of the methods described and/or illustrate herein. FIG. 5 is a flow diagram of an exemplary computer-implemented method 500 in which a computing device autonomously discovers information about its domain. As illustrated in this figure, at step 502 the computing device may determine that a pre-determined period of time has expired. At step 504, the computing device may autonomously multicast connection-characteristic information associated with the computing device to all other common-domain computing devices in the domain of the computing device.

The term "autonomously" generally refers to any method or step performed by a computing device prior to being requested to perform that step or method by an additional computing device. For example, computing device 104 in FIG. 1 may, upon connecting to or booting within network domain 102, begin autonomously multicasting connection-characteristic information associated with computing device 104 to all other computing devices in domain 102 (e.g., computing devices 106 and 108). In this example, computing device 104 may autonomously multicast its connection-characteristic information after it has been connected to domain 102 for a predetermined period of time, such as 3 minutes.

At step 506, the computing device may receive connection-characteristic information from at least one common-domain computing device located within the domain of the computing device. In certain embodiments, and as will be discussed in greater detail below in connection with FIGS. 6A-6B, the connection-characteristic information received at step 506 may be received after establishing a master-client relationship between the computing device and at least one common-domain computing device located within the domain of the computing device.

At step 508, the computing device may identify, based on the connection-characteristic information received in step 506, at least one characteristic of the domain of the computing device. At step 510, the computing device may transmit domain-characteristic information to the source computing device. At step 512, the computing device may receive domain-characteristic-dependent data from the source computing device. Upon completion of step 512, exemplary method 500 may terminate.

Figure 6A:
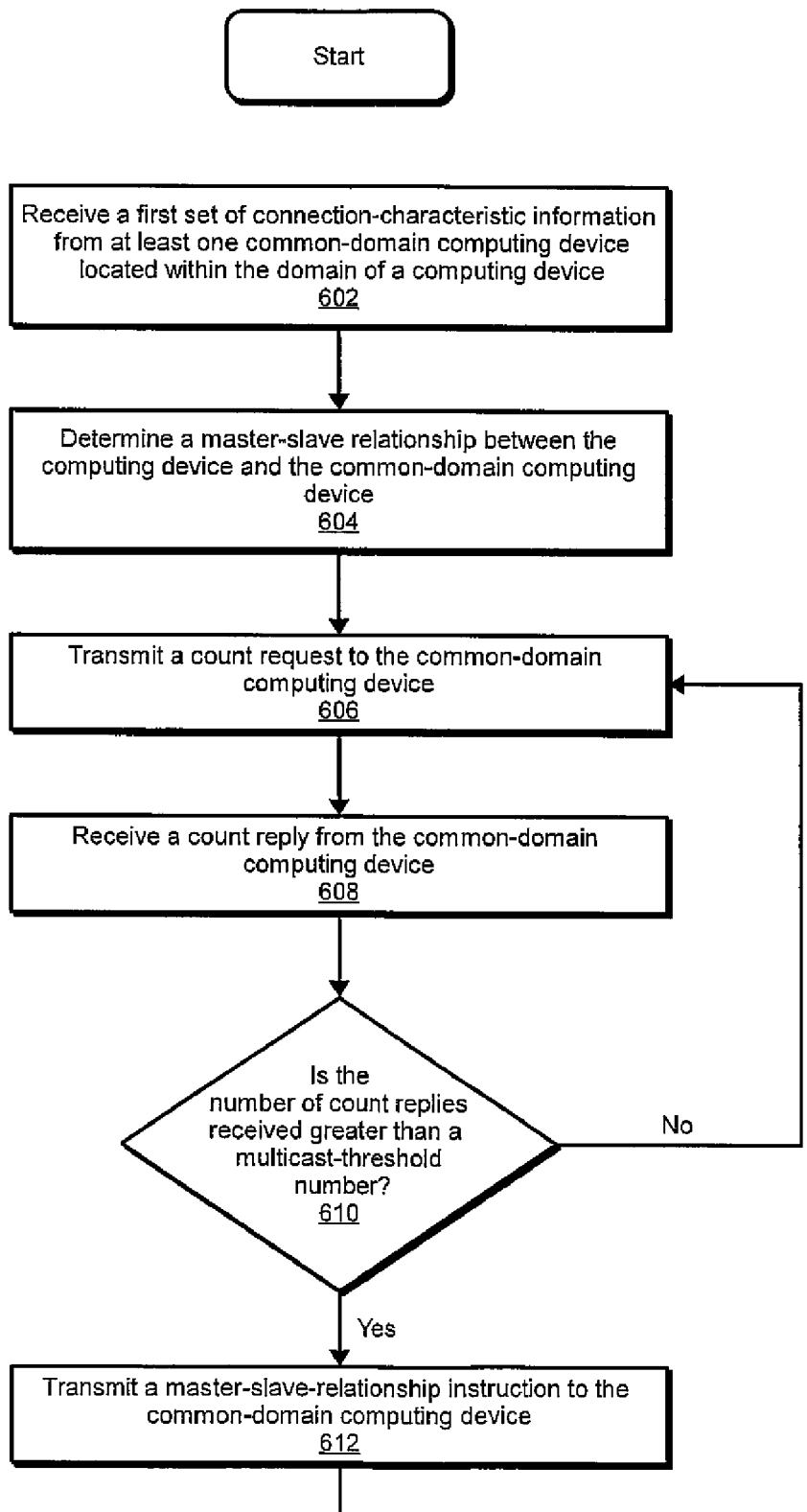

As detailed above, one or more of the exemplary methods described and/or illustrated herein may be utilized to facilitate a multicast session. FIGS. 6A-6B are flow diagrams of an exemplary computer-implemented method 600 for automatically discovering information about a domain of a computing device that may be used in connection with a multicast operation. As illustrated in these figures, at step 602 a computing device may receive a first set of connection-characteristic information from at least one common-domain computer device located within the domain of the computing device. At step 604, the computing device may determine, by comparing the first set of connection-characteristic information received at step 602 with connection-characteristic information associated with the computing device, a master-client relationship between the computing device and the common-domain computing device.

The phrase "master-client relationship" generally refers to a relationship that may be established between computing devices within a domain during a multicast session. For example, during a multicast session, a source computing device, such as source computing device 110 in FIG. 1, may transmit data to a designated "master" computing device, such as computing device 104 in FIG. 1, within a multicast domain, which may then retransmit the data received from the source computing device to client computing devices within its domain, such as computing device 106 and computing device 108. As used herein, the term "master" generally refers to a computing device that communicates directly with a source computing device during a multicast session. Similarly, the term "client" generally refers to a computing device that indirectly receives data from a source computing device during a multicast session via a master computing device.

In certain embodiments, a master computing device may be chosen from within a plurality of computing devices in a multicast domain by identifying a computing device within the multicast domain having the most preferable connection characteristics. For example, the computing device within a multicast domain having the highest MAC address or having the fastest transmission rate or connection speed may be chosen as the master computing device for a multicast session in order to ensure the most efficient and fastest communication possible between the multicast domain and the source computing device. Accordingly, at step 604, determining a master-slave relationship between the computing device and the common-domain computing device may comprise comparing the connection-characteristic information received at step 602 with the connection-characteristic information associated with the computing device. For example, computing device 104 may compare the transmission rate or connection speed of computing devices 106 and 108 with its own connection speed or transmission rate. If the connection speed or transmission rate of computing device 104 is higher than the transmission rate or connection speed of computing devices 106 and 108, then computing device 104 may determine that computer devices 106 and 108 should be designated as client computing devices, while computing device 104 should act as a master computing device.

At step 606, the computing device may transmit count requests to the common-domain devices located within its domain. In certain embodiments, transmitting count requests to the common-domain computing devices within its domain may comprise multicasting count requests to all common-domain computing devices located within the domain of the computing device. A "count request" generally represents a request that each computing device within the domain identify its presence. In one embodiment, the computing device may only transmit count requests to the common-domain computing devices within its domain once it has determined that a predetermined period of time has passed. For example, the computing device may, after determining that it has transmitted its connection-characteristic information for at least 15 consecutive seconds without receiving connection-characteristic information from another computing device within its domain, transmit the count requests to the common-domain computing devices within its domain. At step 608, the computing device may receive a count reply from one or more common-domain computing devices. The phrase "count reply" generally refers to a data packet indicating the presence of a computing device within the multicast domain.

At step 610, the computing device may determine whether the number of count replies received is greater than a multicast-threshold number. The phrase "multicast-threshold number" generally refers to the minimum number of computing devices that must be present in a multicast domain in order to initiate a multicast session. If the number of count replies received is greater than the multicast-threshold number, then at step 612 the computing device may transmit a master-client-relationship instruction to all other computing devices located within its domain. Otherwise, control returns to step 606. The phrase "master-client-relationship instruction" generally refers to an instruction to perform client-specific tasks. For example, computing device 104 in FIG. 1 may transmit a master-client-relationship instruction to computing devices 106 and 108 in FIG. 1 instructing these computing devices to perform client-specific tasks during a multicast session. In certain embodiments, transmitting the master-client-relationship instruction to the common-domain computing devices in step 612 may comprise multicasting the master-client-relationship instruction to all common-domain computing devices located with the domain of the computing device.

At step 614, the computing device may receive a connection request from one or more common-domain computing devices located within its domain. At step 616, a computing device may transmit connection acknowledgements (i.e., data packets acknowledging receipt of the connection request) to the common-domain computing from which the connection request was received in step 614.

At step 618, the computing device may receive a second set of connection-characteristic information from the at least one common-domain computing device located within the domain of the computing device. At step 620, the computing device may identify, based on the second set of connection-characteristic information received from the at least one common-domain computing device, at least one characteristic of the domain of the computing device.

At step 622, the computing device may transmit master-client-relationship information and/or domain-characteristic information to the source computing device. As used herein, the phrase "master-client-relationship" information generally refers to information that identifies the various master and client states of each computing device within a multicast domain during a multicast session. For example, computing device 104 in FIG. 1 may transmit master-client-relationship information to source computing device 110 that identifies computing device 104 as a master computing device and computing devices 106 and 108 as client computing devices in a multicast session.

At step 624, the computing device may receive master-client-relationship-dependent data and/or domain-characteristic-dependent data from the source computing device. The phrase "master-client-relationship-dependent data" generally refers to data that is transmitted or received based on the master-client relationships of a multicast domain. For example, master-client-relationship-dependent data may refer to data that may only be transmitted by a source computing device to a master computing device within a multicast domain. Examples of master-client-relationship-dependent data include, without limitation, a disk or computing device image, a software installation package, a software program update, an operating system update, troubleshooting data, or the like. Upon completion of step 624, exemplary method 600 may terminate.

For the sake of clarity, and by way of example only, the following detailed description will provide, with reference to FIG. 1, an illustration of how exemplary method 600 may be implemented. In this example, computing device 104 may have a connection speed of 100, computing device 106 may have a connection speed of 200, and computing device 108 may have a connection speed of 50. Prior to step 602, computing device 108 may, either autonomously or in response to a request received from source computing device 110, begin periodically multicasting (at a rate of, for example, about once per second) connection-characteristic information identifying its MAC addresses and connection speeds to all other computing devices within domain 102.

At step 602, computing device 106 may receive the connection-characteristic information (containing, for example, connection speed and MAC address information) transmitted by computing device 108. Computing device 106 may then compare its connection speed with that of computing device 108. Because the connection speed of computing device 106 is, in this example, greater than that of computing device 108, computing device 106 may begin multicasting its connection-characteristic information to the other computing devices within domain 102 (namely, computing devices 104 and 108).

When computing device 108 receives the connection-characteristic information transmitted by computing device 106, it may, upon comparing its connection speed with that of computing device 106, cease multicasting its connection speed to all other devices within domain 102 since its connection speed is less than at least one other computing device in domain 102. Similarly, when computing device 104 receives the connection-characteristic information transmitted by computing device 106, it may, upon comparing its connection speed with that of computing device 106, refrain from multicasting its connection speed to all other devices within domain 102 since its connection speed is less than at least one other computing device in domain 102.

Computing device 106 may continue multicasting its connection-characteristic information for a predetermined period of time (e.g., 15 seconds). If computing device 106 determines that it has transmitted its connection-characteristic information for at least 15 consecutive seconds without receiving connection-characteristic information from another computing device within its domain, then at step 604 computing device 106 may identify, by comparing the connection-characteristic information received from other computing devices within its domain (in this case, only computing device 108), a master-client relationship between itself and all other computing device within its domain. For example, computing device 106 may, upon comparing its connection speed with the connection speeds of all other known computing devices within its domain (in this case, computing device 108), determine that computing device 106 should act as a master computing device since it has the fastest connection speed, while all other computing devices in its domain should be designated as client computing devices.

At step 606, computing device 106 may transmit a count request to all other computing devices within its domain. Computing devices 104 and 108 may receive the count request from computing device 106 and transmit count replies in response. At step 608, computing device 106 may receive the count replies from computing device 104 and 108. At step 610, computing device 106 may determine whether the number of count replies received (in this case, two) is greater than a multicast-threshold number (in this example, one).

Since the number of count replies received is greater than the multicast-threshold number, then at step 612 computing device 106 may transmit a master-client-relationship instruction to computing devices 104 and 108 instructing computing devices 104 and 108 to act as clients, during an upcoming multicast session. Upon receiving this master-client-relationship instruction, computing devices 104 and 108 may transmit connection requests to computing device 106. At step 614, computing device 106 may receive the connection requests from computing devices 104 and 108. At step 616, computing device 106 may transmit a data packet to computing devices 104 and 108 acknowledging receipt of the connection requests and confirming the master-client connection established between the devices.

Upon receiving the connection acknowledgement from computing device 106, computing devices 104 and 108 may transmit connection-characteristic information, such as information identifying their MAC addresses and connection speeds, to computing device 106. At step 618, computing device 106 may receive this second set of connection-characteristic information from computing devices 104 and 108. At step 620, computing device 106 may identify, based on the second set of connection-characteristic information received from computing devices 104 and 108, at least one characteristic of domain 102, such as the speed of each computing device within domain 102.

At step 622, computing device 106 may transmit master-client-relationship information and/or domain-characteristic information to source computing device 110 identifying the various master and client states of each computing device within domain 102 and/or one or more characteristics of domain 102. For example, computing device 106 may transmit master-client-relationship information to source computing device 110 that identifies computing device 106 as a master computing device and computing devices 104 and 108 as client computing devices in a multicast session. Similarly, computing device 106 may transmit domain-characteristic information to source computing device 110 that specifies the connection or transmission speeds and MAC addresses for computing devices 104, 106, and 108.

At step 624, computing device 106 may receive master-client-relationship-dependent data and/or domain-characteristic-dependent data from the source computing device. For example, master computing device 106 may receive a disk image from source computing device 110. Master computing device 106 may then retransmit this disk image to client computing devices 104 and 108. Upon completion of step 620, exemplary method 600 may terminate.

Figure 7:
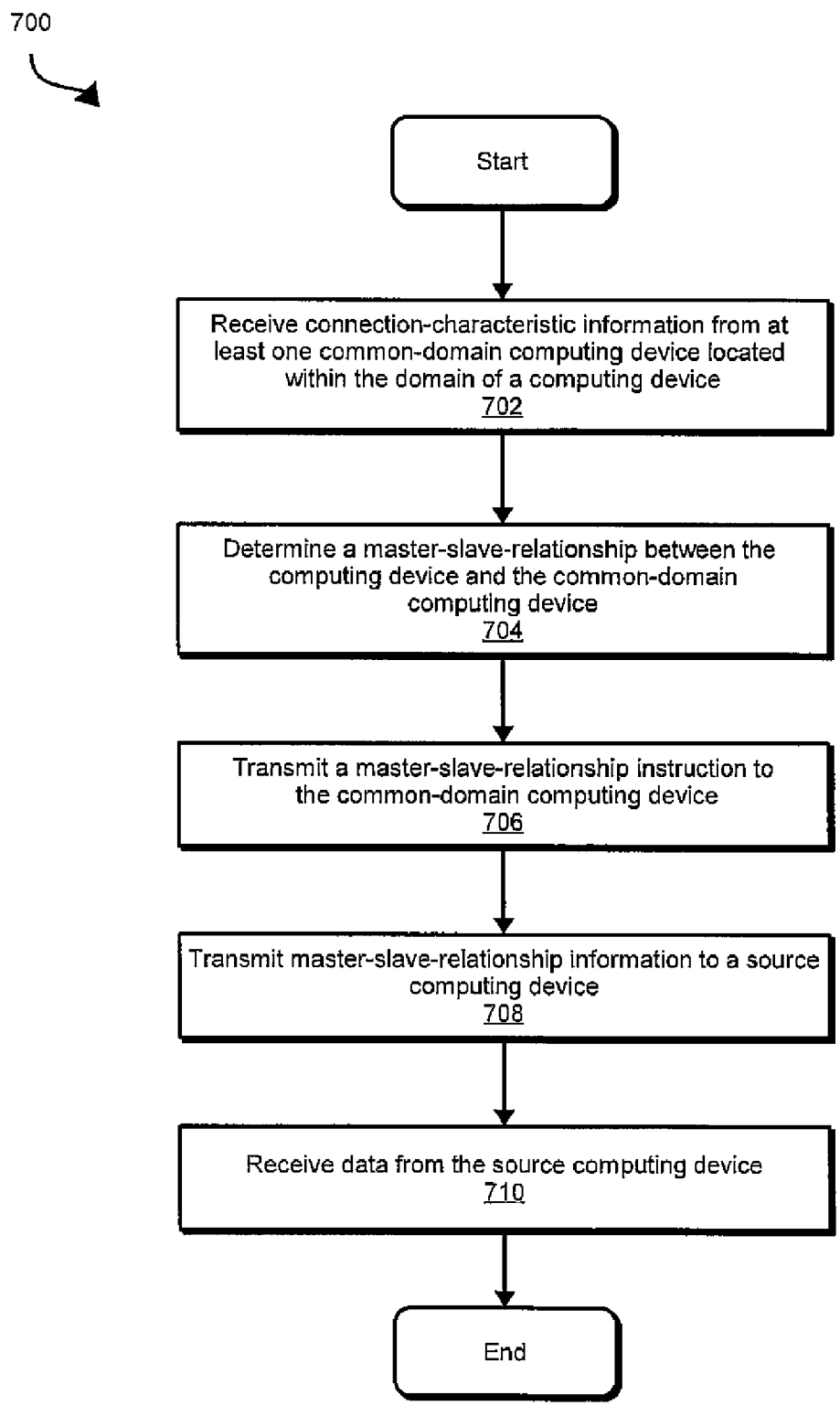
FIG. 7 is a flow diagram of an exemplary computer-implemented method for automatically discovering information about a domain of a computing device according to an additional embodiment.

FIG. 7 is a flow diagram of an exemplary computer-implemented method for automatically discovering information about a domain of a computing device according to an additional embodiment. As illustrated in this figure, at step 702 a computing device may receive connection-characteristic information from at least one common-domain computing device located within the domain of the computing device. At step 704, the computing device may determine, by comparing the connection-characteristic information received at step 702 with connection-characteristic information associated with the computing device, a master-client relationship between the computing device and the common-domain computing device. At step 706, the computing device may transmit a master-client-relationship instruction to the common-domain computing device. At step 708, the computing device may transmit master-client-relationship information to a source computing device. At step 710, the computing device may receive data, such as master-client-relationship dependent or domain-characteristic-dependent data, from the source computing device. Upon completion of step 710, exemplary method 700 may terminate.

Figure 8:
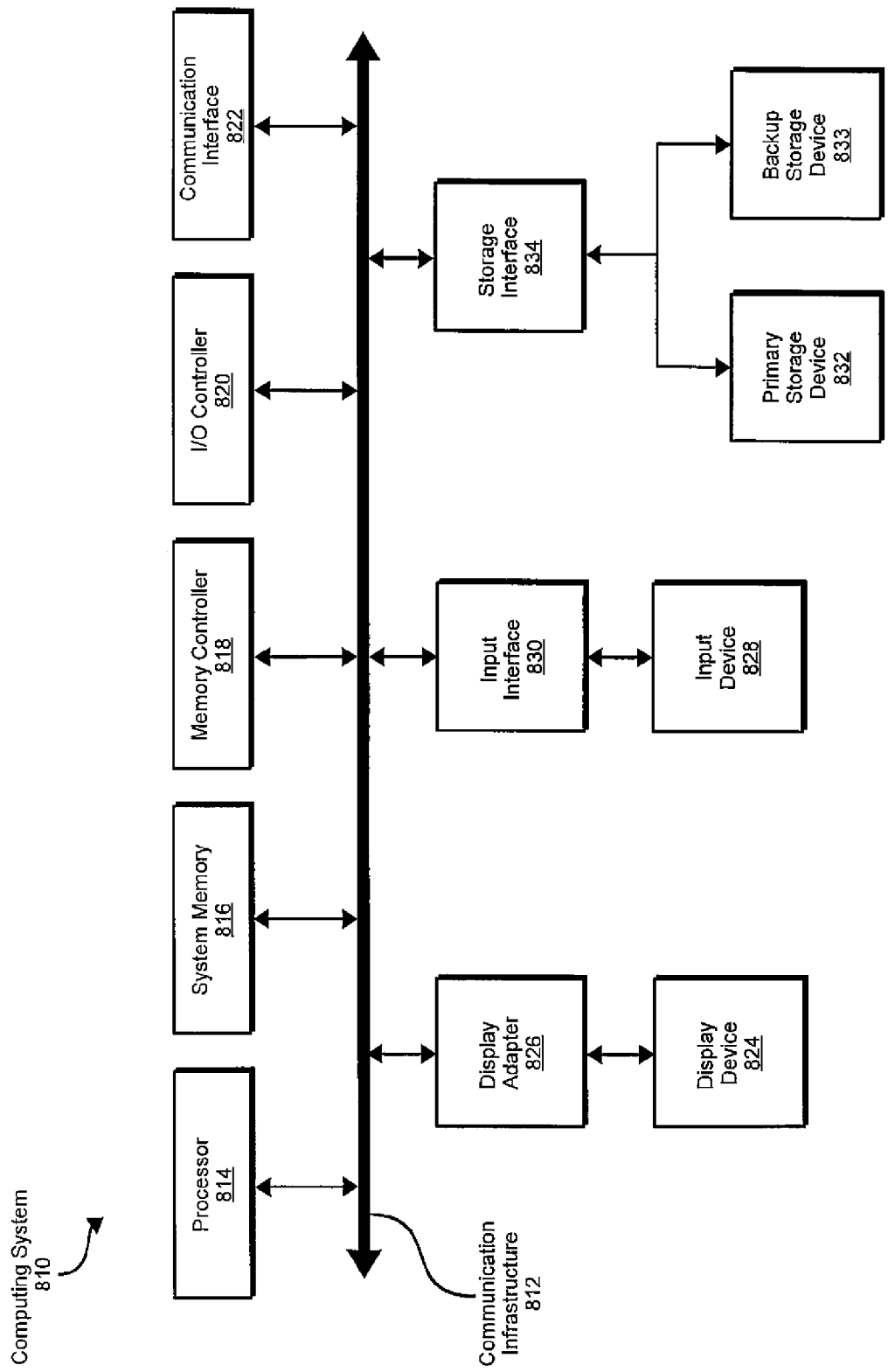
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the receiving, comparing, identifying, transmitting, receiving, multicasting, and determining steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing device 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 818, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller may perform and/or be a means for performing, either alone or in combination with other elements, one or more of the steps or features described and/or illustrated herein, such as receiving, comparing, identifying, transmitting, receiving, multicasting, and determining.

I/O controller 820 generally represents any type or form of module capable of coordinating and/or controlling the input and output functions of a computing device. For example, in certain embodiments I/O controller may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the receiving, comparing, identifying, transmitting, receiving, multicasting, and determining steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the receiving, comparing, identifying, transmitting, receiving, multicasting, and determining steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the receiving, comparing, identifying, transmitting, receiving, multicasting, and determining steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, the exemplary file systems disclosed herein may be stored on primary storage device 832, while the exemplary file-system backups disclosed herein may be stored on backup storage device 833. Storage devices 832 and 833 may also be used, for example, to perform and/or be a means for performing, either alone or in combination with other elements, one or more of the receiving, comparing, identifying, transmitting, receiving, multicasting, and determining steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments descried and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical, media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
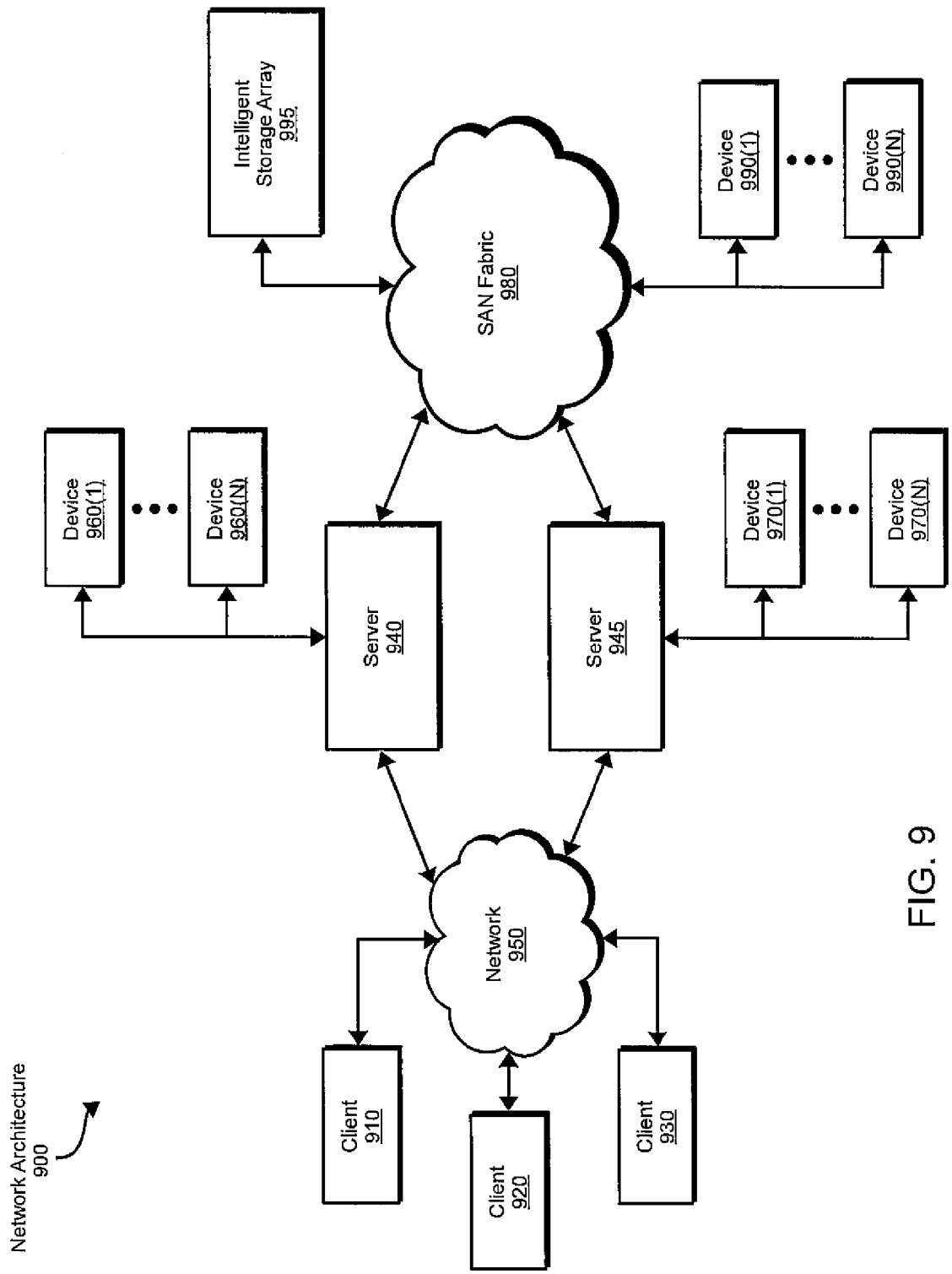
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960 (1)-(N) may be directly attached to server 940. Similarly, one or more storage devices 990(1)-(N) may be directly attached to server 945. Storage devices 960(1)-(N) and storage devices 990(1)-(N) generally represent any type or form of storage device or medium capable of storing data and/or other computer-readable instructions. In certain embodiments, storage devices 960(1)-(N) and storage devices 990(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 950, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990 (1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the receiving, comparing, identifying, transmitting, receiving, multicasting, and determining steps disclosed herein. Network architecture 900 may also be used to perform and/or be a means for performing other steps and features set forth in the instant disclosure.

For example, in certain embodiments the exemplary file systems disclosed herein may be stored on client systems 910, 920, and/or 930. Similarly, the exemplary file-system backups disclosed herein may be stored on server 940, server 945, storage devices 960(1)-(N), storage devices 970(1)-(N), storage devices 990(1)-(N), intelligent storage array 995, or any combination thereof.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically discovering information about a domain of a computing device, the method comprising:

receiving connection-characteristic information from at least one common-domain computing device located within the domain of the computing device;

determining a master-client relationship between the computing device and the at least one common-domain computing device;

identifying, based on the connection-characteristic information received from the at least one common-domain computing device, at least one characteristic of the domain of the computing device;

transmitting domain-characteristic information to a source computing device, the domain-characteristic information comprising the at least one characteristic of the domain of the computing device;

transmitting master-client relationship information to the source computing device, the master-client relationship information comprising the identity of the computing device designated as a master computing device and the identity of the at least one common-domain computing device designated as a client computing device during a multicast session;

receiving domain-characteristic-dependent data from the source computing device.

2. The method of claim 1, further comprising, prior to receiving the connection-characteristic information from the at least one common-domain computing device:

receiving a request from the source computing device to discover information about the domain of the computing device;

in response to the request from the source computing device, multicasting connection-characteristic information associated with the computing device to all common-domain computing devices in the domain of the computing device.

3. The method of claim 1, further comprising, prior to receiving connection-characteristic information from the at least one common-domain computing device:

determining that a predetermined period of time has expired;

autonomously multicasting connection-characteristic information associated with the computing device to all common-domain computing devices in the domain of the computing device.

4. The method of claim 1, further comprising, prior to identifying the at least one characteristic of the domain of the computing device:

determining the master-client relationship between the computing device and the at least one common-domain computing device by comparing the connection-characteristic information received from the at least one common-domain computing device with connection-characteristic information associated with the computing device;

transmitting a master-client-relationship instruction to the at least one common-domain computing device.

5. The method of claim 4, further comprising, after transmitting the master-client-relationship instruction to the at least one common-domain computing device:

receiving a connection request from the at least one common-domain computing device;

transmitting a connection acknowledgement to the at least one common-domain computing device;

receiving a second set of connection-characteristic information from the at least one common-domain computing device;

wherein the at least one characteristic of the domain of the computing device is identified based on the second set of connection-characteristic information received from the at least one common-domain computing device.

6. The method of claim 4, wherein transmitting the master-client-relationship instruction to the at least one common-domain computing device comprises multicasting the master-client-relationship instruction to all common-domain computing devices in the domain of the computing device.

7. The method of claim 4, wherein the master-client-relationship instruction comprises an instruction to perform client-specific tasks.

8. The method of claim 1, further comprising:

determining, by comparing the connection-characteristic information received from the at least one common-domain computing device with connection-characteristic information associated with the computing device, a master-client relationship between the computing device and the at least one common-domain computing device;

transmitting a count request to the at least one common-domain computing device;

receiving a count reply from the at least one common-domain computing device;

determining whether the number of count replies received is greater than a multicast-threshold number;

if the number of count replies received is greater than the multicast-threshold number, transmitting a master-client-relationship instruction to the at least one common-domain computing device;

receiving a connection request from the at least one common-domain computing device;

transmitting a connection acknowledgement to the at least one common-domain computing device.

9. The method of claim 8, wherein:

transmitting the count request to the at least one common-domain computing device comprises multicasting the count request to all common-domain computing devices in the domain of the computing device;

transmitting the master-client-relationship instruction to the at least one common-domain computing device comprises multicasting the master-client-relationship instruction to all common-domain computing devices in the domain of the computing device.

10. The method of claim 1, wherein the computing device performs at least one of the following steps:

receiving the connection-characteristic information from the at least one common-domain computing device;

identifying the at least one characteristic of the domain of the computing device;

transmitting the domain-characteristic information to the source computing device;

receiving the domain-characteristic-dependent data from the source computing device.

11. The method of claim 1, wherein the connection-characteristic information comprises at least one of:

processor-speed information for at least one common-domain computing device located within the domain of the computing device;

connection-speed information for at least one common-domain computing device located within the domain of the computing device;
logical-address information for at least one common-domain computing device located within the domain of the computing device;
physical-address information for at least one common-domain computing device located within the domain of the computing device;
hardware-address information for at least one common-domain computing device located within the domain of the computing device.

12. The method of claim 1, wherein the domain-characteristic information comprises at least one of:
connection-characteristic information associated with the computing device;
the connection-characteristic information received from the at least one common-domain computing device;
master-client-relationship information;
domain-topology information.

13. The method of claim 1, wherein the computing device is a multicast-capable computing device and the domain is a multicast domain.

14. The method of claim 1, wherein the source computing device is a server.

15. The method of claim 1, wherein the domain-characteristic-dependent data comprises at least one of:
a computing device image;
a software installation package;
a software program update;
an operating system update;
troubleshooting data.

16. A computer-implemented method for automatically discovering information about a domain of a computing device, the method comprising:
receiving a first set of connection-characteristic information from at least one common-domain computing device located within the domain of the computing device;
determining, by comparing the first set of connection-characteristic information received from the at least one common-domain computing device with connection-characteristic information associated with the computing device, a master-client relationship between the computing device and the at least one common-domain computing device;
transmitting a master-client-relationship instruction to the at least one common-domain computing device;
transmitting master-client-relationship information to a source computing device, the master-client relationship information comprising the identity of the computing device designated as a master computing device and the identity of the at least one common-domain computing device designated as a client computing device during a multicast session;
receiving data from the source computing device.

17. The method of claim 16, wherein the data received from the source computing device is master-client-relationship-dependent data that comprises at least one of:
a computing device image;
a software installation package;
a software program update;
an operating system update.

18. The method of claim 16, further comprising:
receiving a second set of connection-characteristic information from the at least one common-domain computing device located within the domain of the computing device;
identifying, based on the second set of connection-characteristic information received from the at least one common-domain computing device, at least one characteristic of the domain of the computing device;
transmitting domain-characteristic information to the source computing device, the domain-characteristic information comprising the at least one characteristic of the domain of the computing device.

19. The method of claim 18, wherein the data received from the source computing device is domain-characteristic-dependent data that comprises at least one of:
a computing device image;
a software installation package;
a software program update;
an operating system update.

20. A computer-readable non-transitory storage device comprising one or more computer-executable instructions that, when executed by a computing device, cause the computing device to:
receive connection-characteristic information from at least one common-domain computing device located within a domain of the computing device;
determine a master-client relationship between the computing device and the at least one common-domain computing device;
identify, based on the connection-characteristic information received from the at least one common-domain computing device, at least one characteristic of the domain of the computing device;
transmit domain-characteristic information to a source computing device, the domain-characteristic information comprising the at least one characteristic of the domain of the computing device;
transmit master-client relationship information to the source computing device, the master-client relationship information comprising the identity of the computing device designated as a master computing device and the identity of the at least one common-domain computing device designated as a client computing device during a multicast session;
receive domain-characteristic-dependent data from the source computing device.

* * * * *